May 28, 1963 W. C. BELL 3,091,012
METHOD AND APPARATUS FOR MAKING BRIQUETTES
Filed March 6, 1959 11 Sheets-Sheet 1
FIG. 1
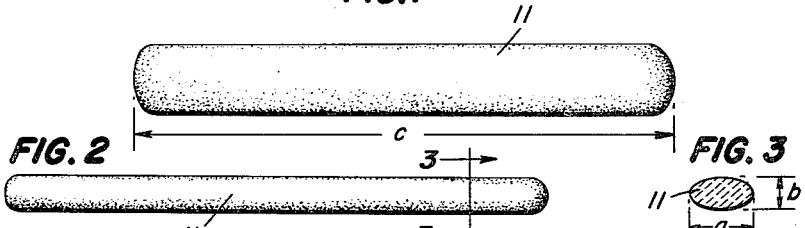
FIG. 2
FIG. 3
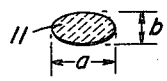
FIG. 4
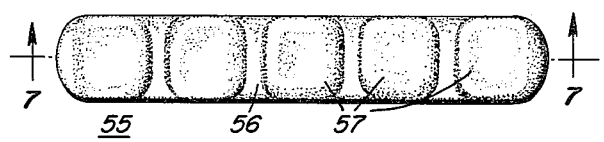
FIG. 5
FIG. 6
FIG. 7
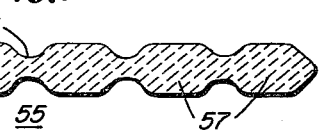
FIG. 8
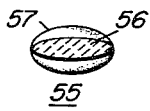
FIG. 9
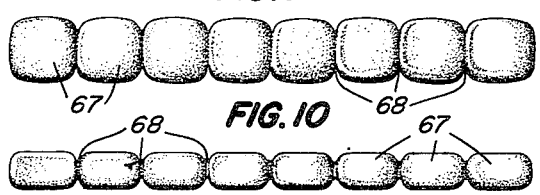
FIG. 10
FIG. 11
FIG. 12
FIG. 13
FIG. 14
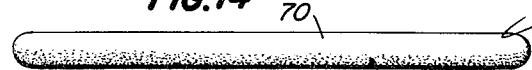
FIG. 15
INVENTOR
William C. Bell
BY
ATTORNEY May 28, 1963  W. C. BELL  3,091,012
METHOD AND APPARATUS FOR MAKING BRIQUETTES
Filed March 6, 1959  11 Sheets-Sheet 2
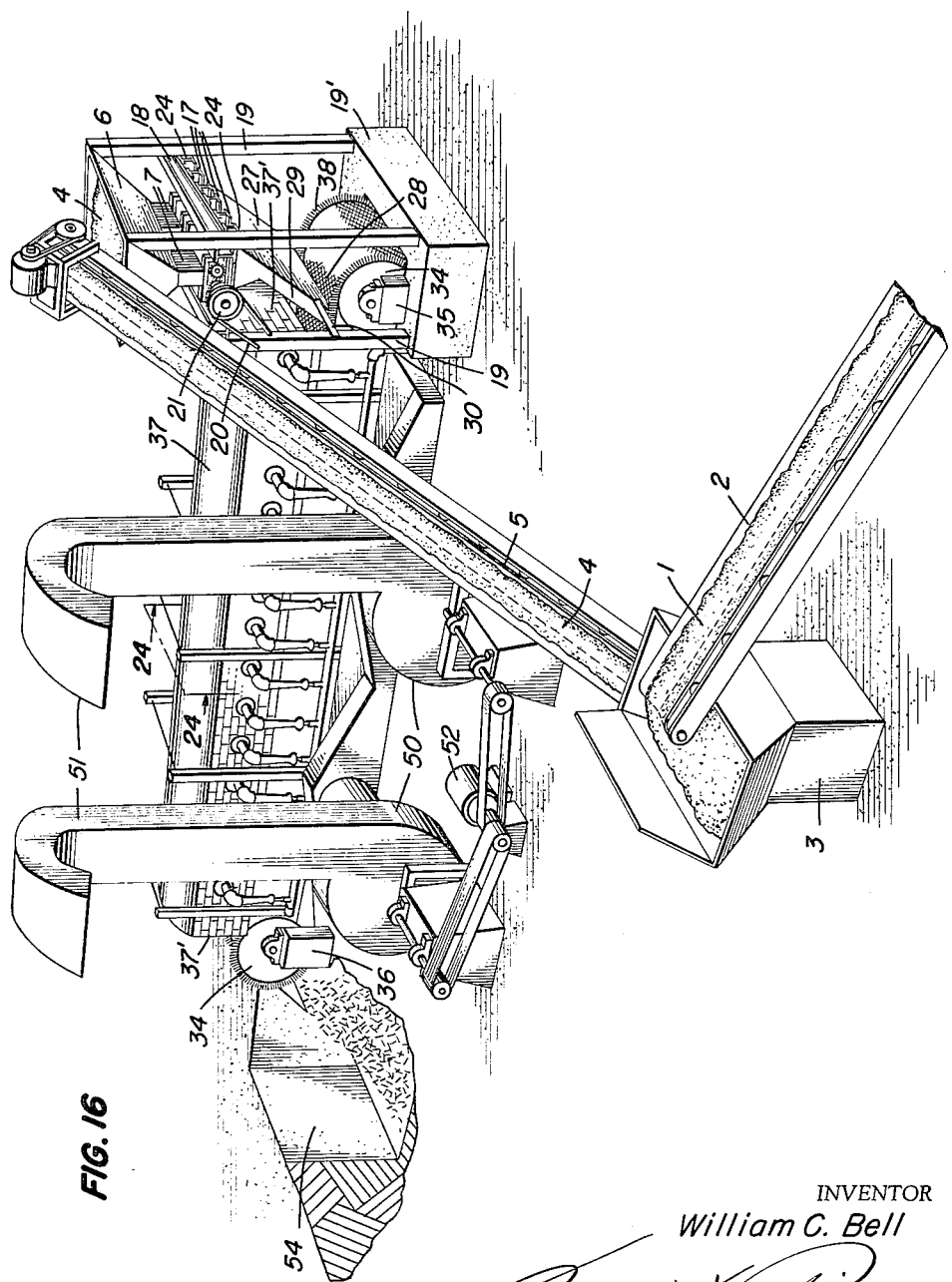
FIG. 16
INVENTOR
William C. Bell
BY 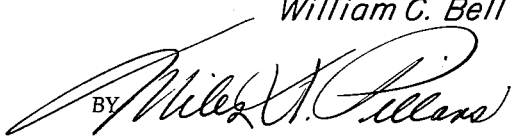
ATTORNEY

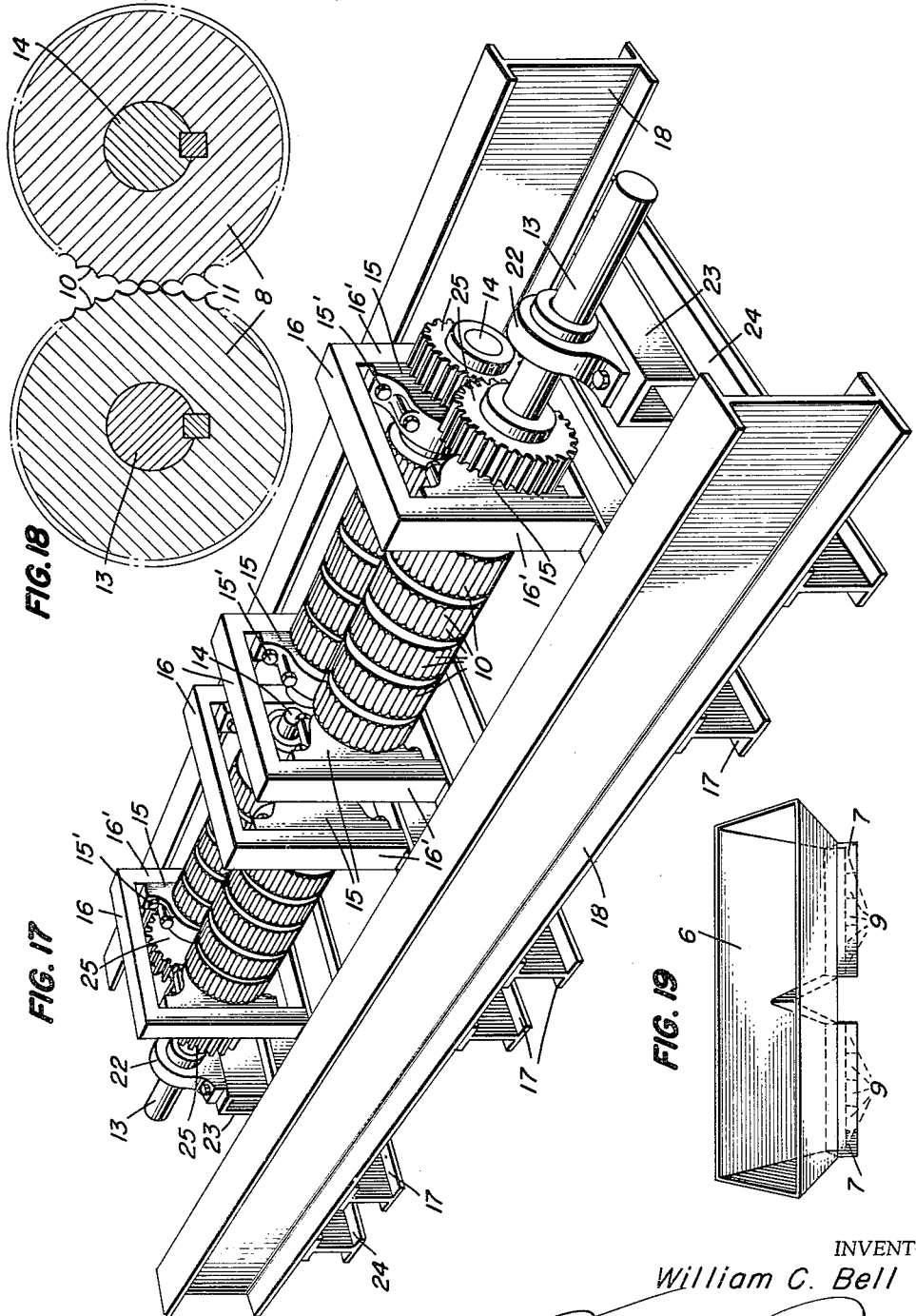

May 28, 1963 W. C. BELL 3,091,012
METHOD AND APPARATUS FOR MAKING BRIQUETTES
Filed March 6, 1959 11 Sheets-Sheet 4
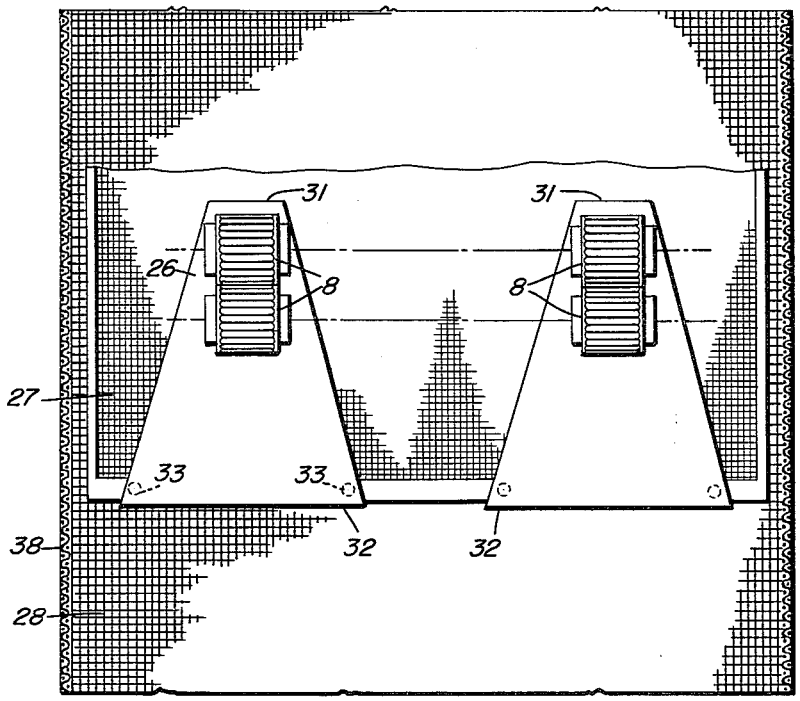
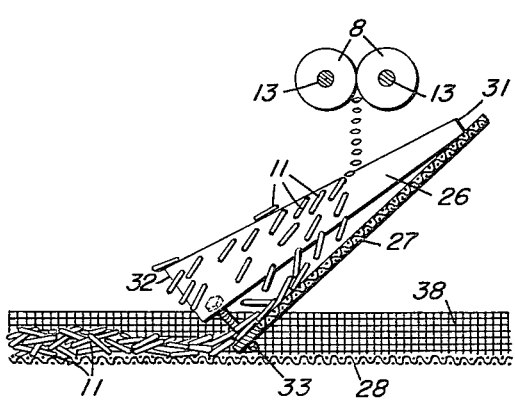
INVENTOR
William C. Bell
BY
ATTORNEY

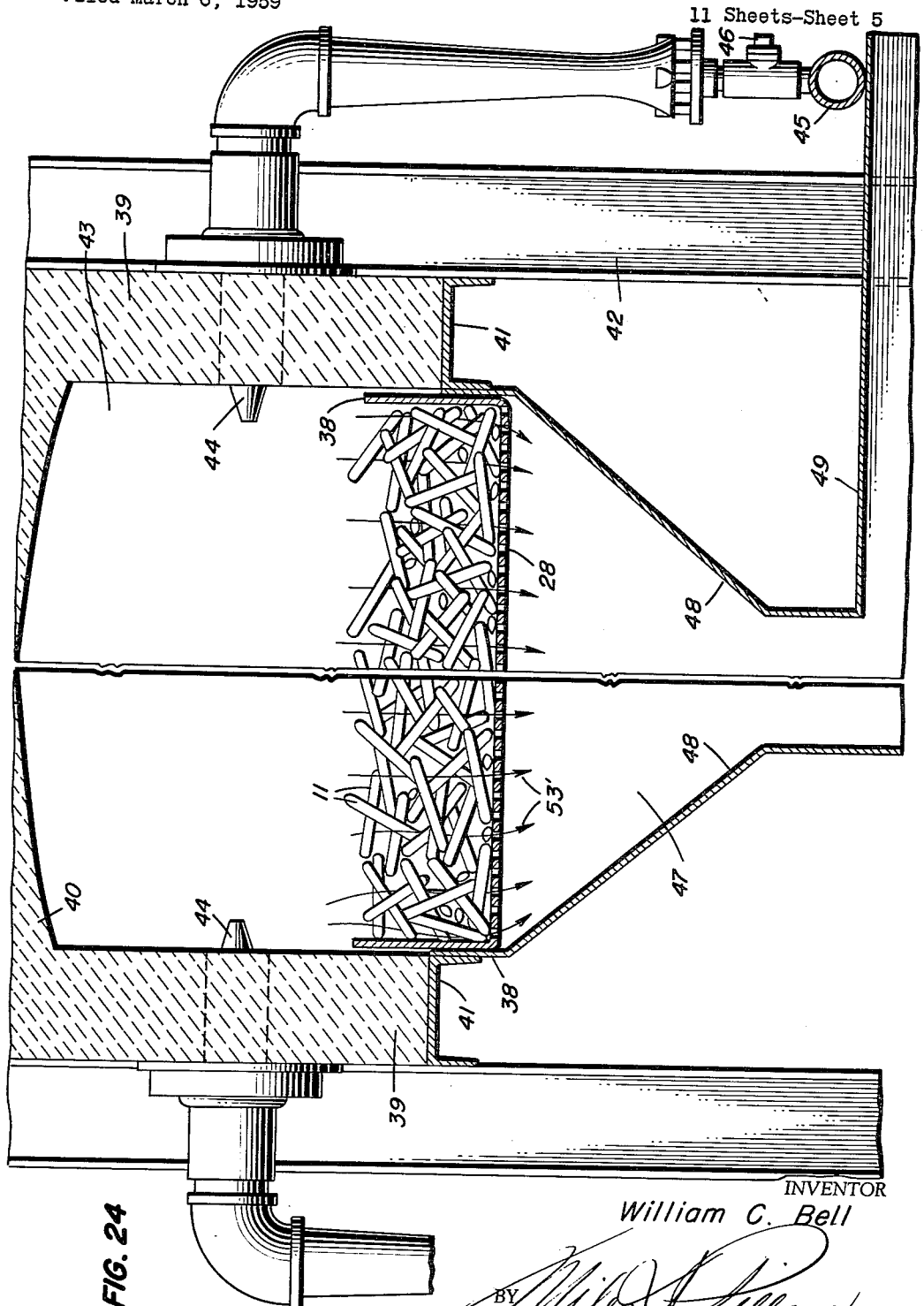

May 28, 1963  W. C. BELL  3,091,012
METHOD AND APPARATUS FOR MAKING BRIQUETTES
Filed March 6, 1959  11 Sheets-Sheet 6
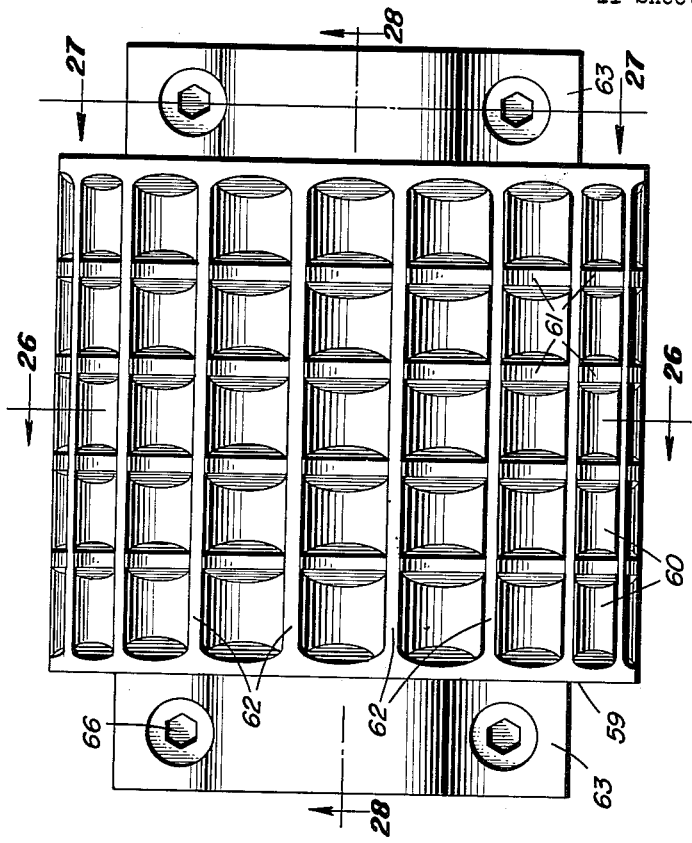
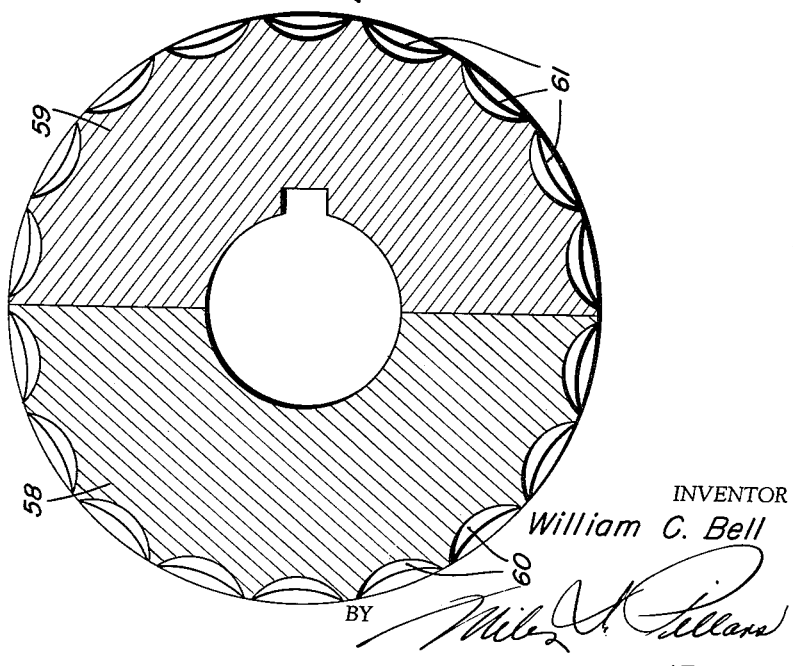
INVENTOR
William C. Bell
BY
ATTORNEY May 28, 1963 W. C. BELL 3,091,012
METHOD AND APPARATUS FOR MAKING BRIQUETTES
Filed March 6, 1959 11 Sheets-Sheet 7
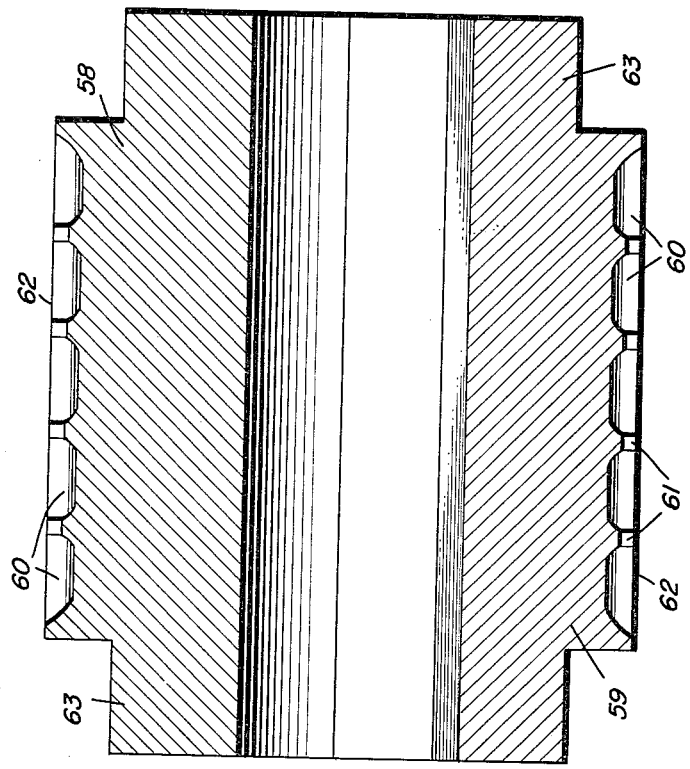
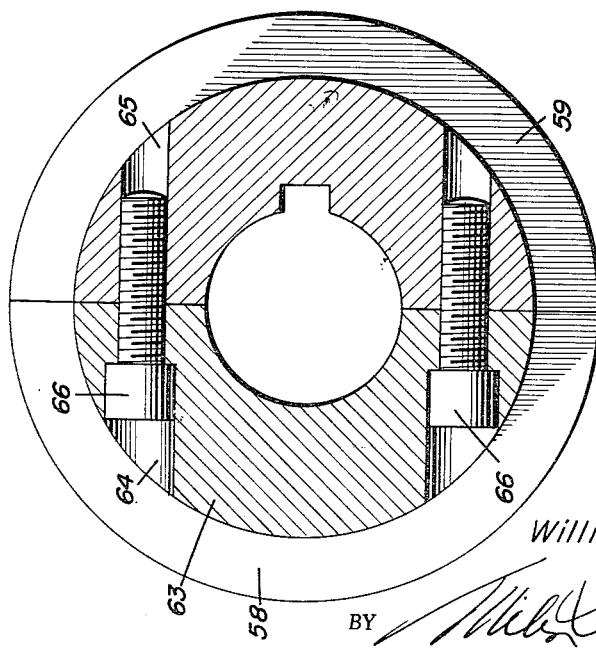
INVENTOR
William C. Bell
BY
ATTORNEY May 28, 1963 W. C. BELL 3,091,012
METHOD AND APPARATUS FOR MAKING BRIQUETTES
Filed March 6, 1959 11 Sheets-Sheet 8
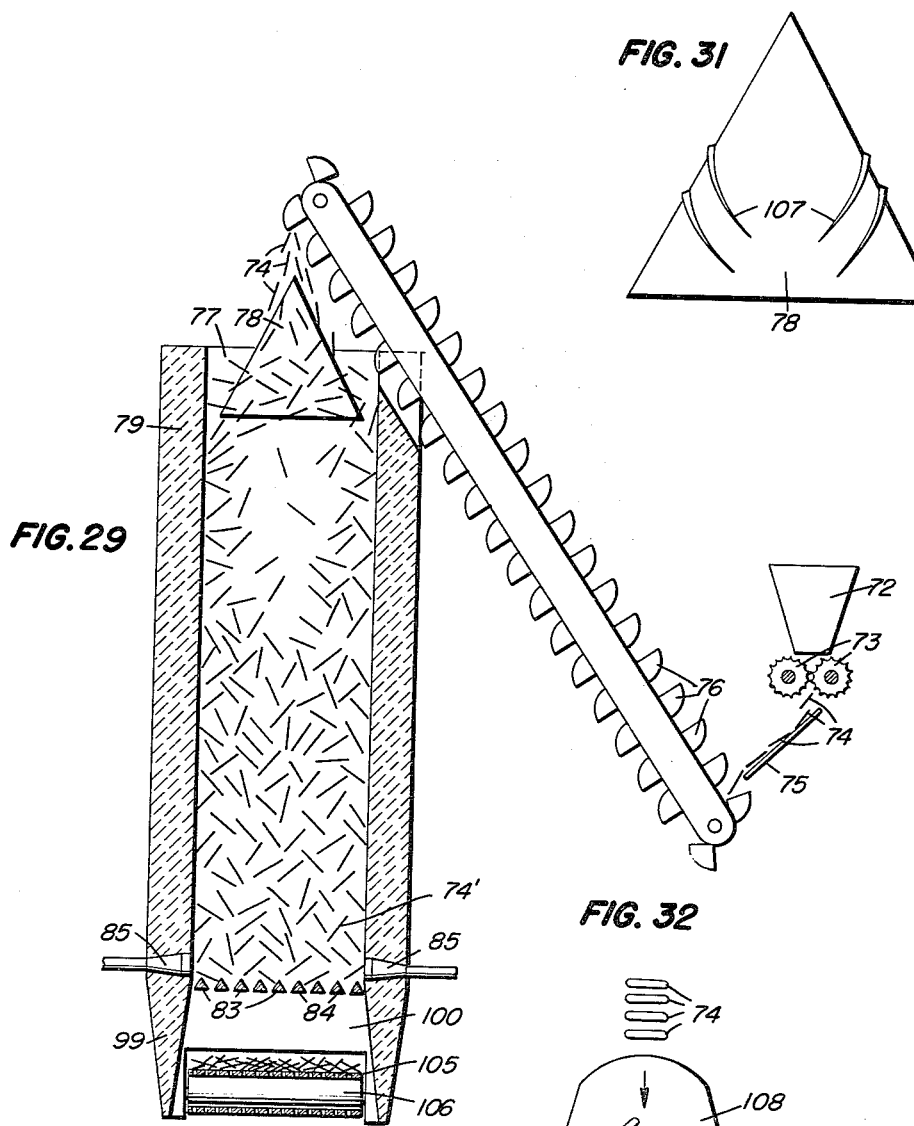
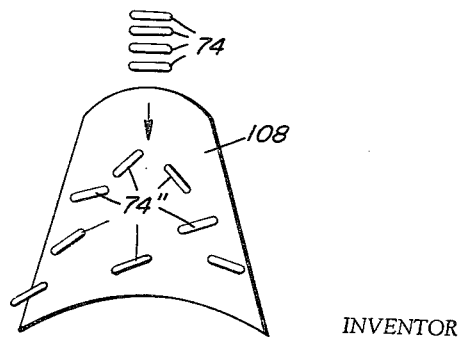
INVENTOR
William C. Bell
BY *Miles S. Pillans*
ATTORNEY

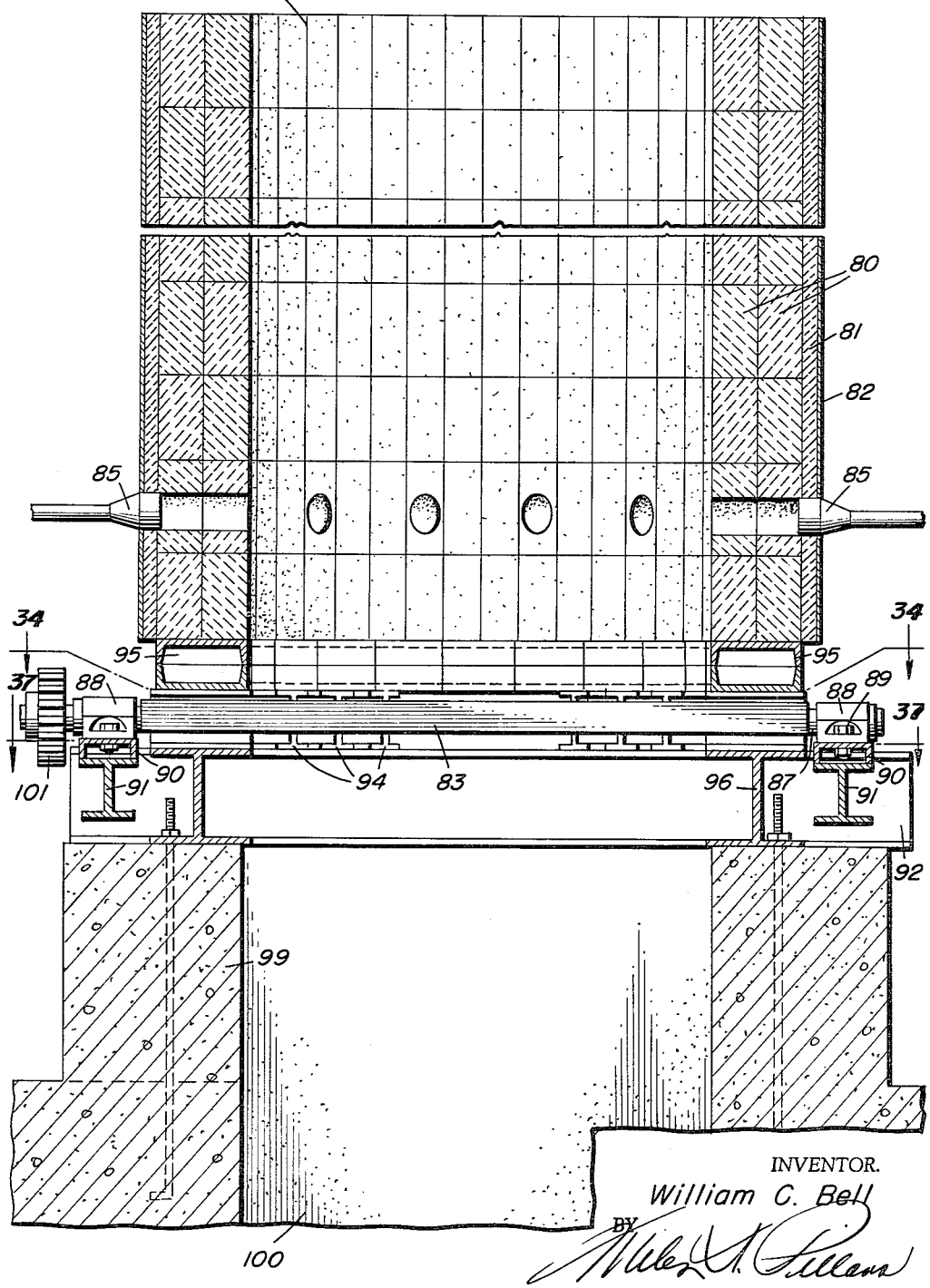

INVENTOR.
William C. Bell
ATTORNEY

May 28, 1963  W. C. BELL  3,091,012
METHOD AND APPARATUS FOR MAKING BRIQUETTES
Filed March 6, 1959  11 Sheets-Sheet 11

Air for Secondary Combustion

INVENTOR.
William C. Bell
BY
ATTORNEY 3,091,012
Patented May 28, 1963

3,091,012
METHOD AND APPARATUS FOR MAKING BRIQUETTES
William C. Bell, Raleigh, N.C., assignor of one-fourth to S. Perry Brown, Austin, Tex., and one-fourth to Paul M. Brown, Shreveport, La.
Filed Mar. 6, 1959, Ser. No. 797,715
6 Claims. (Cl. 25—2)

This invention relates to improved methods and apparatus for making briquettes. More particularly, this invention is related to improved methods for preparing, molding, and heat treating briquettes and equipment for carrying out such processes.

This application is a continuation-in-part of copending application Serial No. 666,565 of the same applicant, now abandoned, filed June 19, 1957.

In structural engineering, road building, and similar projects in which concrete forms a major part of the construction, it has been found that a relatively uniform sized light weight aggregate often provides a structural unit of superior strength and quality at a much lower overall cost of the finished product than similar structures which incorporate natural aggregate, such as gravel. Manufactured aggregate provides a more uniform finished product, and, in reinforced concrete structures, where a substantial part of the required reinforcement and of the associated structural steel members are needed simply to carry and support the weight of the concrete in the structure, it is of great importance to minimize the weight of the concrete in the structures.

It has been found that a good quality of manufactured light weight aggregate will provide the same strength as natural aggregate, and the reduction in weight resulting from such use reduces the amount of structural steel to such an extent that the overall cost is less than a similar structure using natural aggregate, even where gravel and crushed rock may be plentiful. In certain localities, natural aggregate is very scarce and expensive, and, in such localities, materials such as clay or shale for the manufacture of light weight aggregate may be plentiful. This provides another good reason for the manufacture and utilization of high grade light weight manufactured aggregate.

According to the present invention, an improved type of light weight aggregate is adapted to be manufactured from briquettes having improved qualities of strength and uniformity resulting from improved methods of manufacture provided by improved manufacturing equipment. Briquettes of the improved type which this invention pertains can best be made from argillaceous material, such as clay or shale, which is first molded by applying pressure to relatively small increments of the raw material, so as to shape the molded material into relatively long slim cigar or lima bean pod shapes. Raw briquettes thus made then are suitably heat treated to remove moisture and carbonaceous materials which may be present in the raw briquettes and to sinter the argillaceous material into a hard porous solid mass. Such heat treatment not only removes undesirable foreign substances from the briquettes, but, in so doing, also forms a solidified mass of material which is substantially uniformly interspersed with a large number of very small voids.

In order to obtain this desired heat treatment of the briquettes, it is highly important that the raw briquettes be substantially uniformly heated. Such uniformed heating requires that the source of heat must be capable of being applied as uniformly as possible to all of the briquettes and to all parts of each briquette. In order to obtain this desirable uniform heat distribution for the treatment of the raw briquettes, it has been found that a distribution of briquettes in a jackstraw pattern as a bed on a pervious support provides a highly efficient heat transfer arrangement. The desired heat treatment or sintering of the jackstraw bed of briquettes can be carried out very effectively by the passage of a hot fluid, such as hot or burning gas, through the bed and progressively discharging the fired briquettes from one end of the chamber in which they are heat treated, while replenishing the supply of briquettes in the desired jackstraw patterned bed at the other end of the heat treating chamber.

With such a jackstraw briquette bed arrangement, the amount of heat treatment necessary to provide the best quality sintered briquettes can be regulated in several ways, as by regulating the pressure under which the heat treating fluid is supplied to and withdrawn from the heat treating chamber, by regulating the quantity and temperature of the heat treating fluid passed through the jackstraw bed of briquettes, and by varying the time during which the briquettes are exposed to the heat treatment. Thus, the improved method of manufacturing light weight briquettes can be very accurately and easily controlled to provide the required results with a maximum efficiency in the utilization of materials.

In sintering, roasting, calcining, and similar processes, wherein a solid is contacted by a fluid for a heat or chemical transfer between the solid and the fluid, the efficiency with which such a transfer is accomplished depends largely upon the intimacy with which the chemical charge of solid material is contacted by the fluid. Two very important factors which determine this intimacy of contact are the shape of the solid being exposed and the arrangement of the solid to provide for the passage of the fluid in contact therewith. It is of importance, therefore, that the solid be in sufficiently small increments to provide for relatively uniform penetration of heat to all areas of the solid, and these increments of material should be distributed or arranged so as to provide for a substantially uniform passage of the fluid over all increments of the material. Both of these important factors are utilized in carrying out this invention.

In order to obtain a substantially uniform penetration of heat through each briquette, these briquettes are formed with a relatively small cross sectional area. This formation provides for the easy transfer of heat through the material of which a briquette is composed and also readily permits the easy escape of vapors and gases which may be formed within the briquette as moisture therein vaporizes and carbonaceous materials therein are burned and transformed into gas. Furthermore, a substantially uniform heat treatment of the various briquettes is obtained by the general configuration of the individual briquettes as relatively long slim jacksticks which are distributed into a highly non-uniform jackstraw pattern and provide for a maximum exposure of the surface area of each briquette, thus assuring a maximum contact between each briquette and the heated fluids flowing over the briquettes. Thus, the configuration of the briquettes and their jackstraw distribution overcomes the great disadvantages formerly encountered in processinng briquettes of conventional ellipsoidal, spherical, cubical, or the like substantially equiaxed uniform shapes, commonly in use in the past. Such uniformly shaped briquettes have a tendency to become aligned and to form a closely packed bed when they are distributed on a supporting base, so that there are relatively few voids between briquettes through which hot fluid can pass. Furthermore, with conventional type briquettes, in which there is a mixture of large and small units, the smaller units will tend to fill the voids and passages between the larger units and thus close or greatly restrict fluid flow in some localities, so as to cause a greater flow of fluid through more unrestricted passages. This will tend to produce overheating or hot spots in the bed of briquettes which will result in overburned briquettes in some parts of the bed and underburned or green briquettes in other parts of the bed. According to the present invention, these disadvantages are eliminated, and improved equipment facilitates carrying out the improved process for manufacturing briquettes.

A very important aspect of this invention is, therefore, the design of briquette shapes, which will tend to cause the briquettes inherently to become arranged as a bed in a jackstraw pattern on a suitable support as they are released from the briquette forming molds. Briquettes of such shapes in a jackstrawed bed present a maximum exposure of the surfaces of the briquettes, with a highly irregular maximum number of interstices and passages through the bed. Furthermore, such a highly irregular distribution of the briquettes, together with a long slim rigid configuration thereof, minimizes the possibility of an alignment of briquettes in a bed and minimizes the stacking of briquettes in a manner which would substantially fill voids between adjacent briquettes. This jackstrawing of the briquettes also may be accentuated by using a suitable distributor between the molding rolls and the support for the briquette bed to aid in haphazardly spreading and intermittently delivering briquettes over a wide area of the bed support.

An object of this invention is to provide a process which provides an improved briquette configuration.

An important object of this invention is the design of briquette shapes which will, when falling to a bed, inherently tend to become arranged in a jackstraw pattern bed.

Another object of this invention is to provide an improved method of making briquettes.

A further object of this invention is to provide an improved method of forming briquettes which will tend inherently to form a jackstraw bed and heat processing the briquettes in such a jackstraw arrangement.

Still another object of this invention is to provide a process for substantially uniformly heat treating a chemical charge, such as briquettes.

A still further object of this invention is to provide an improved process for treating raw materials which will result in a substantially uniform product having improved structural properties.

Yet another object of this invention is the provision of improved equipment for the manufacture of briquettes.

A yet further object of this invention is the provision of improved apparatus for forming light weight briquettes and aggregate.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is a plan view of a briquette made in accordance with this invention;

FIG. 2 is a side elevational view of the briquette shown in FIG. 1;

FIG. 3 is a sectional view taken along line 3—3 of FIG. 2;

FIG. 4 is a plan view of another configuration of a briquette made according to this invention, having a substantially lima bean pod shape;

FIG. 5 is a side elevational view of the briquette shown in FIG. 4;

FIG. 6 is a sectional view taken along line 6—6 of FIG. 5;

FIG. 7 is a sectional view taken along line 7—7 of FIG. 4;

FIG. 8 is a sectional view taken along line 8—8 of FIG. 5;

FIG. 9 is a plan view of another embodiment of a briquette made in accordance with this invention, in which a plurality of substantially uniform nodules are formed lengthwise of the briquette;

FIG. 10 is a side elevational view of the briquette shown in FIG. 9;

FIG. 11 is a plan view of another embodiment of a briquette, made in accordance with this invention comprising a plurality of alternatively large and small nodules;

FIG. 12 is a side elevational view of the briquette shown in FIG. 11;

FIG. 13 is a plan view of still another embodiment of a briquette made in accordance with this invention;

FIG. 14 is a side elevational view of the briquette shown in FIG. 13;

FIG. 15 is a sectional view taken along line 15—15 of FIG. 13;

FIG. 16 is an overall schematic illustration of a plant utilizing an embodiment of equipment made in accordance with this invention for manufacturing improved briquettes;

FIG. 17 is a prospective view of a set of briquetting rolls, together with a mounting structure and gear drive of a type utilized in equipment, such as that shown in FIG. 16;

FIG. 18 is a cross sectional view of a pair of briquetting rolls, such as that shown in FIG. 17, taken at right angles to the axes of such rolls and showing the relationship of molding cavities on these rolls for compressing raw material into briquettes;

FIG. 19 is a perspective view of a hopper adapted to feed raw material to briquetting rolls in equipment, such as that shown in FIGS. 16 and 17;

FIG. 20 is a schematic plan view illustrating equipment adapted to be used in a plant, such as that shown in FIG. 16, wherein two pairs of briquetting rolls are adapted to be used for molding briquettes, and a spreader or distributor is provided for each pair of rolls in order to assist in arranging briquettes in a jackstraw layer, as a bed, on a perforate traveling conveyor belt support;

FIG. 21 is a schematic side elevational view of the equipment shown in FIG. 20 illustrating the operation of this equipment in molding and distributing briquettes formed by the equipment;

FIG. 22 is an enlarged end view of the small upper end of a spreader of the type shown in FIGS. 20 and 21;

FIG. 23 is an enlarged end view of the large lower end of a spreader of a type shown in FIGS. 20 and 21;

FIG. 24 is an enlarged sectional view partly broken away, taken along line 24—24, of the sintering furnace equipment shown in FIG. 16;

FIG. 25 is a plan view of a modified form of briquette molding roll, made in accordance with this invention, for forming briquettes of the type shown in FIGS. 4–8;

FIG. 26 is a sectional view, taken along line 26—26, of the briquetting roll shown in FIG. 25;

FIG. 27 is a sectional view, taken along line 27—27 of FIG. 25, illustrating details of the end hubs of the rolls and the manner of securing them together;

FIG. 28 is a sectional view, taken along line 28—28 of FIG. 29, illustrating further details of this briquette molding roll;

FIG. 29 is a schematic view, partly in section, of equipment made in accordance with this invention utilizing a vertical or shaft type sintering furnace;

FIG. 30 is a plan view of a jackstraw briquette spreader or distributor for use in a vertical or shaft type furnace, such as that shown in FIG. 29;

FIG. 31 illustrates a modified form of the distributor shown in FIG. 30, wherein flutes or guide vanes are added to the conical surface of the distributor to assist in obtaining the desired jackstraw arrangement of briquettes in the sintering furnace;

FIG. 32 is an elevational view of a further modified form of briquette distributor, similar to that shown in FIGS. 20–23, which may be used in connection with the equipment shown in FIG. 29, and which illustrates the manner in which briquettes would be distributed with such a distributor;

FIG. 33 is an enlarged sectional elevational view illustrating structural details of a vertical or shaft type furnace for use in a system such as that shown in FIG. 29;

Figure 34:
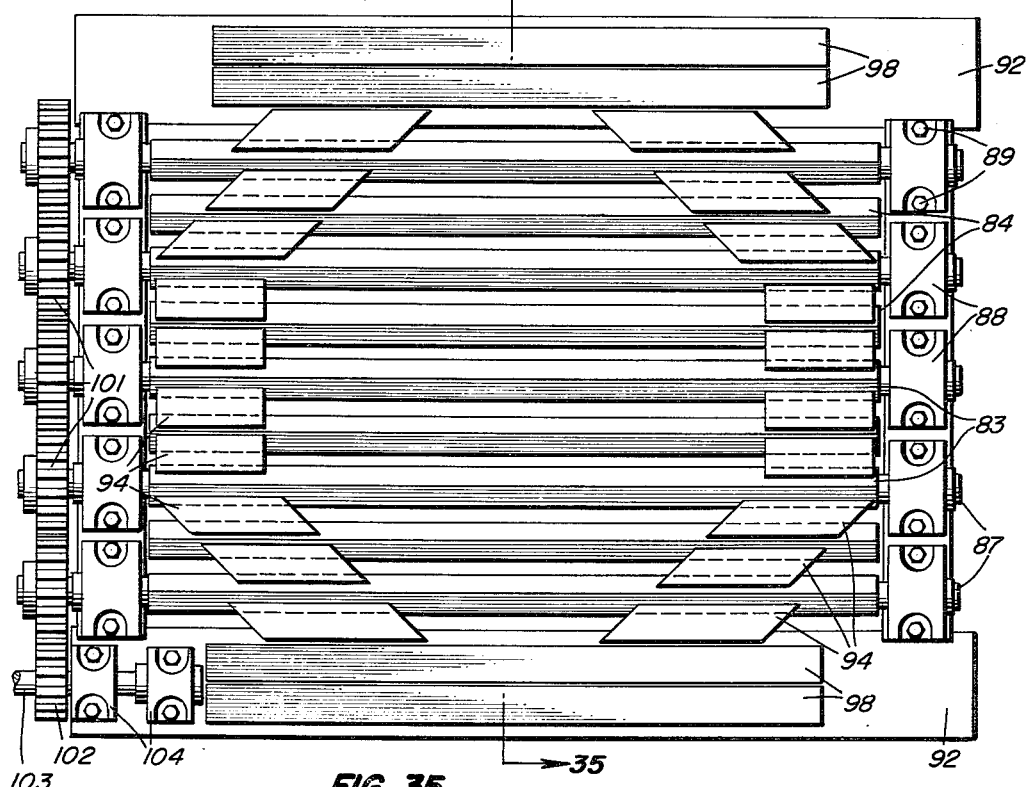
FIG. 34 is a sectional view taken along lines 34—34 of FIG. 33, illustrating the grate and furnace wall supporting structure of the furnace shown in FIG. 33.
Figure 35:
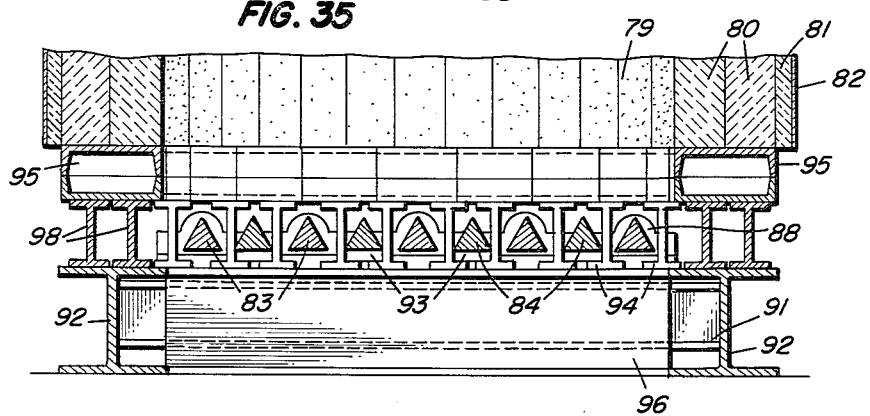
FIG. 35 is a sectional view taken along line 35—35 of FIG. 34, illustrating the relative arrangement of the furnace base and grate, viewed at right angles to FIG. 33.
Figure 36:
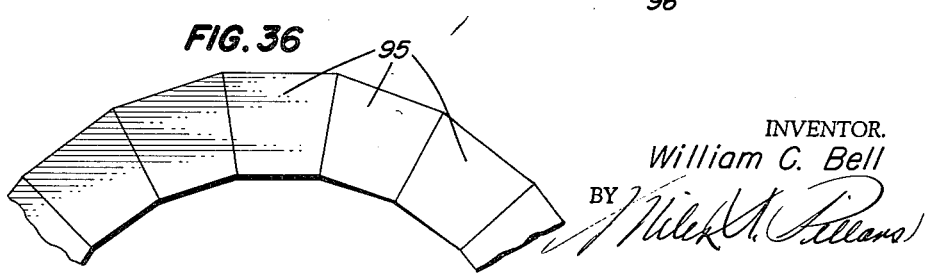
FIG. 36 is a fragmentary plan view of a water cooled supporting ring for the walls of the furnace shown in FIGS. 33–35.
Figure 37:
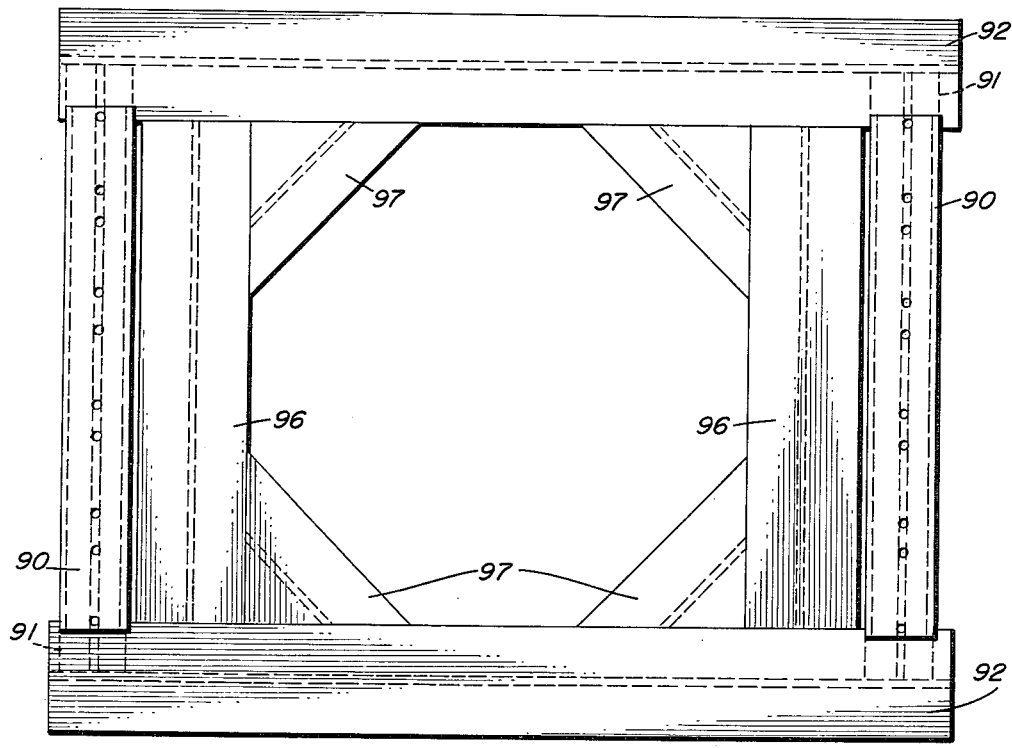
FIG. 37 is a sectional view taken along line 37—37 of FIG. 33, illustrating the furnace base frame structure.
Figure 38:
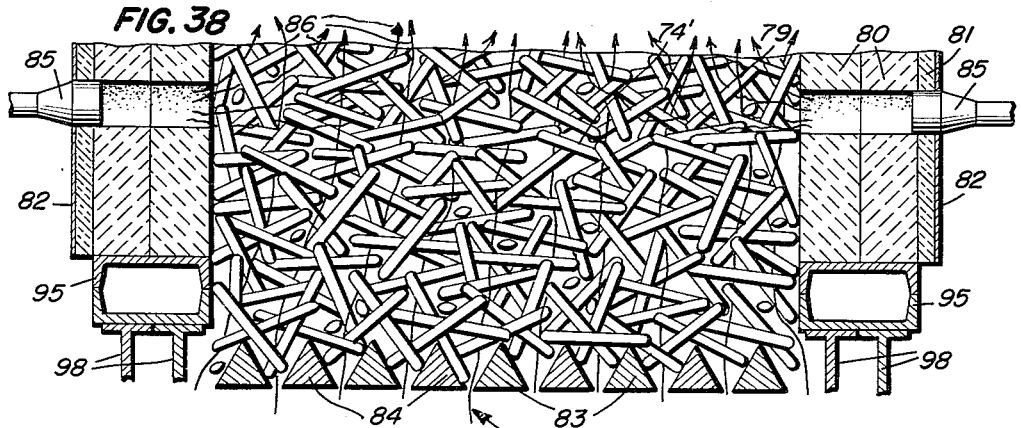
Figure 39:
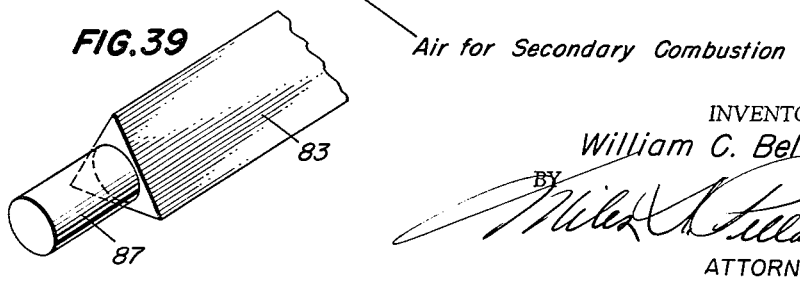

FIG. 38 is a fragmentary elevational sectional view, similar to that shown in FIG. 35, illustrating the jackstraw arrangement of briquettes in a vertical or shaft type furnace and diagrammatically showing the paths of gases through jackstrawed briquettes in the furnace; and FIG. 39 is a fragmentary perspective view illustrating details of a rotatable grate bar of the type shown in FIGS. 33, 34, and 35.

Referring to the drawings, several different embodiments of various aspects of this invention are illustrated. Broadly this invention has wide and varied applications to many physical and chemical processes wherein it is desired to apply heat to a material or otherwise to subject such material to an intimate contact with a fluid. This invention is useful both in sintering processes and in chemical processes wherein solids are adapted to be contacted by fluids for reaction purposes. For illustrative purposes pyrochemical heat treatment of ore, such as argillaceous material, has been selected in which the raw material is subjected to an improved process and formed into improved briquette configurations by equipment incorporating various features specifically designed in accordance with this invention to provide the desired improved process and product resulting from this process.

In FIGS. 16–24 equipment is shown for carrying out certain process aspects of the present invention. FIG. 16 shows the general arrangement of a plant for forming and heat treating ore, wherein raw material 1, such as clay or shale, is adapted to be delivered from a convenient stock pile by a conveyor belt 2, or similar apparatus, to an ore crusher or mixer 3. This crusher is adapted to pulverize and mix the raw clay or shale, so that it passes from the crusher as a substantially uniform mixture of relatively small particles or increments which are thoroughly mixed and have a substantially uniform moisture contact. This pulverized clay or shale is adapted to be compressed and formed into briquettes, which are to be heat treated to produce sintered briquettes to be readily broken into smaller increments of a size suitable for use as aggregate in structural concrete.

In most instances, it will be found that clay or shale contains a limited amount of moisture in its natural state, however, should such raw material be found to be excessively dry so that it can not be readily molded under heavy pressure, a suitable amount of moisture, preferably in the form of ordinary water, should be added at this stage of the process. Such water can be added to the pulverized raw material in the crusher or may be sprayed thereon as the material is discharged into the crusher. This feature of the process does not form a part of the present invention but is an important step in properly treating raw material which is to be processed according to the present invention.

Argillaceous material 4 which has been pulverized and mixed in the crusher 3 is discharged onto a conveyor belt 5, which delivers this treated raw material to a hopper 6. This hopper is constructed and arranged to deliver pulverized raw material 4 selectively to one or more pairs of briquette molding rolls which are adapted to compress and form the pulverized raw material into highly compressed individual briquettes. These briquettes have a generally elongated configuration, similar to a relatively long slim cigar or lima bean pod in shape. Briquettes of this type are illustrated in FIGS. 1–15.

FIGS. 17, 18, 20, and 21 illustrate one embodiment of briquetting rolls made in accordance with this invention for thus compressing and forming briquettes. With this type of roll, raw material 4 is adapted to be fed from the hopper 6 through chutes 7 to two sets of briquette molding rolls 8. The chutes 7 preferably are formed with valves or gates 9, which can be individually opened or closed to regulate the feed of raw material 4 to the rolls 8.

As more clearly shown in FIG. 17, each roll 8 may be formed of a plurality of axially spaced circumferential rows of mold cavities 10, which are relatively long axially of the roll and are substantially semi-elliptical in transverse cross section. The ends of the mold cavities preferably are tapered and terminate in round ends which facilitate release of the molded briquettes from the mold cavities. Such molds will form simple elongated briquettes 11 of the type shown in FIGS. 1–3, having a generally elliptical cross section, with major and minor diameters having respective ratios thereof to briquette length from 5:24 to 1:12 and 1:8 to 1:24. Circumferentially adjacent mold cavities in each roll are spaced apart by relatively smooth narrow lands 10′, which are adapted to come together in circumferential and axial alignment as the lands of each circumferential row are turned to positions in a plane through the axes of each pair of briquetting rolls 8. Furthermore, axially adjacent circumferential rows of mold cavities 10 are separated by relatively narrow cylindrical lands 12, formed on the same radius as the axial lands 10′.

As is more clearly shown in FIG. 17, rolls 8 of each cooperating pair of rolls are mounted on shafts 13 and 14, and these shafts are supported by suitable bearing blocks 15 in rigid mounting frames 16 secured in any suitable manner, as by welding, to rigid I-beams 17 of a general supporting frame structure, including cross beams 18 to form a structural unit of the rolls and mountings. The bearing blocks 15 are secured by bolts 15′ on side posts 16′ of the frames 16, so as to provide for readily adjusting the position of each roll 8 relative to the other in order to maintain the desired axial alignment and spacing of the axial lands 11, as previously described. Suitable pillars or posts 19 mounted on a foundation 19′ extend upwardly and provide a frame for supporting the hopper 6 and the roll supporting cross beams 18 in the desired relationship for delivery of ore to the rolls.

Each cooperating pair of rolls preferably is individually driven by a suitable source of power either directly or through a mechanical transmission, such as a belt 20 connected to a pulley 21 mounted on an extension of the shaft 13. This latter shaft is preferably additionally supported by a suitable bearing block 22 rigidly supported in any suitable manner, as by a channel member 23 mounted on an I-beam 24 secured to the cross beams 18. Each cooperating set of rolls 8 is adapted to be driven in synchronism by a suitable pair of gears 25 mounted on the shafts 13 and 14, so that a semi-elliptic mold cavity in each circumferential row synchronously is rotated to a position in axial alignment directly opposite to a complementary semi-elliptic mold cavity in the other roll of the cooperating pair of rolls. In this manner, pulverized raw material which is fed to the rolls 8 from the hopper 6 passes by gravity into the space between the adjacent upper sides of adjacent cooperating pairs of rolls 8 and fills the mold cavities 10 in adjacent surfaces of the rolls 8. Rotation of the rolls 8, as they are driven by the gears 25, cause cooperating pairs of axially aligned mold cavities to compress the raw material in these cavities into relatively long slim elliptically sectioned briquettes.

The compression of the raw material in this manner tends to force the raw material which may be present over the axially extending lands 11 and the cylindrical lands 12 away from these lands as they rotate substantially into engagement as each briquette is individually molded. This tends to assure the formation of individual briquettes which are separate from adjacent briquettes and are free to become disengaged from the mold cavities 10 and fall freely individually from briquetting rolls after having been molded therein. Briquettes which are thus discharged from the rolls 8, while generally still containing a limited amount of moisture, are fairly rigid and are able to withstand a reasonable amount of impact shock without rupture or breakage so that such briquettes generally will not be broken or substantially distorted by a free fall from the briquetting rolls 8 to a distributor which is adapted to deliver the briquettes to perforate support in the form of a jackstrawed bed.

The mold cavities 10 in each briquetting roll 8 of axially adjacent circumferential rows preferably are staggered, with the longitudinal center lines of mold cavities 10 in one circumferential row arranged substantially midway between the longitudinal center lines of mold cavities in an axially adjacent circumferential row. With such a construction briquettes molded in axially adjacent circumferential rows will be alternatively discharged from the briquetting rolls, and this will further aid in providing a jackstraw distribution of the long slim briquettes as they are delivered to the perforate supporting bed from the molding rolls.

A construction of the feed and molding apparatus of the foregoing type provides the highly desirable result of individually molding briquettes of the desired long slim configuration which may be delivered intermittently from axially adjacent circumferential rows of molding cavities and provides for a maximum versatility in the use of the equipment for regulating the amount and speed of delivery of briquettes from a given set of molding rolls. In the illustrated construction, wherein each roll is formed with five axially spaced circumferential rows of molding cavities, several combinations of sets of circumferential rows may be utilized, depending upon the gates 9 of the hopper 6 which are opened so as to feed raw material to selected sets of circumferential molding rows.

Under certain circumstances, it will be found that a given type of raw material having certain adhesive and plastic qualities will result in the formation of briquettes which will be released or discharged from the molding cavities in an irregular manner, so that the briquettes will not fall in a regular pattern from the molding rolls. It will often be found that one end or another of a briquette will become loosened from a mold cavity before the other end of the briquette and this will tend to cause the briquette to fall from the molding rolls with one end lower than the other. In most instances, this will give the briquette a slight swinging motion so that it will not fall in a straight line downwardly from the molding rolls. This non-uniformity of the release of briquettes from the molding rolls causes the briquettes from adjacent circumferential rows of molds, and even briquettes from the same circumferential row of molds, to fall upon the receiving perforate support and upon other briquettes on the support in a very haphazard manner. The long slim rigid configuration of the briquettes thus released from the molds causes them to accumulate on the perforate support in a jackstraw pattern which presents a maximum exposure of the surfaces of the briquettes in a highly irregular maximum number of interstices and passages through a bed or layer of such jackstrawed briquettes. This irregular distribution of the briquettes together with the configuration thereof minimizes the possibility of an alignment of briquettes in a bed and minimizes the stacking of briquettes in a manner which substantially fills voids between adjacent briquettes.

In order further to assure a maximum jackstrawing of the briquettes as they are delivered to a perforate support from the molding rolls, a suitable distributor can be arranged under the molding rolls which will accentuate the haphazard and intermittent delivery of the long slim briquettes to the perforate support. Such a distributor may take various forms for the purpose of spreading the briquettes in a jackstraw pattern over a wider area as they are discharged from a set of molding rolls. It has been found that with a suitable distributor the desired jackstraw bed of briquettes can be obtained with only two pairs or even a single cooperating pair of circumferential rows of molding cavities. Such an arrangement is illustrated in FIGS. 20–23.

Preferably each cooperating pair of circumferential rows of molding cavities is provided with an individual briquette distributor. As illustrated, this distributor may comprise a curved smooth surfaced sheet 26, which can conveniently be made of suitable sheet metal. Each distributor is positioned under a cooperating pair of molding rolls 8, so that briquettes discharged from the rolls will fall directly upon the curved surface of the distributor sheet 26. As is more clearly shown in FIG. 21, the distributor preferably is mounted over a backing plate 27 which slopes downwardly from the molding rolls 8 towards a perforate bed support 28. The backing plate preferably is made of a suitable wire screen which is rigidly secured at its upper end in any suitable manner to the roll supporting I-beams 17, and is provided with briquette retaining sides 29 secured by suitable braces 30 to the frame posts 19. This backing plate arrangement provides a convenient chute for receiving briquettes molded by the rolls 8 and for guiding these briquettes onto the perforate support 28.

In order to increase the jackstraw distributing effects of the curved distributor plate 26, this plate is mounted on the backing plate 27, so that it slopes downwardly from adjacent to the molding rolls 8 towards the perforate support 28 and is formed with its upper end 31 smaller than its lower end 32 as shown in FIGS. 22 and 23. With this type of equpment, the number of distributor plates 26 should correspond to the number of cooperating circumferential pairs of molding cavities 10 which are used to form briquettes, so that the briquettes from each pair of molding cavities will be substantially uniformly distributed over the support 28. Furthermore, in order to obtain a uniform heat treatment of briquettes, it is also desirable that the jackstraw bed of briquettes on the perforate support 28 be of a substantially uniform depth. Such uniformity of the jackstraw bed of briquettes will provide for a substantially even distribution of the heated fluid as it passes through the jackstraw bed.

In order to obtain such uniform distribution of briquettes on the perforate support 28, it is desirable that briquettes should be fed from the molding rolls 8 to the perforate support 28 and distributed transversly over the entire area of the perforate support. In order to regulate this type of distribution, the lower end 32 of the curved distributor plate 26 is adjustably mounted on the backing plate 27, so that both its curvature and the width of the lower end 32 can be varied. Such an adjustable support can readily be provided by mounting the lower end 32 on a pair of adjustable positioning screws 33, which provide for securing the outer corners of the lower end 32 of the distributor plate 26 at varying heights above the backing plate 27, thereby making it possible to adjust the pitch or slope of the distributor plate. These positioning screws 33 also can be threadedly secured to the backing plate 27 at different transverse positions thereon, so as to obtain an adjustment of the spacing between the screws 33, and thus provide an adjustment of the curvature of the plate 26 and of the transverse width of the distributor plate 26. By thus adjusting the slope, width, and curvature of the distributing plate 26, a wide variation can be obtained in the transverse distribution of briquettes over the perforate support 28.

In order to utilize a continuous process in the treatment of the briquettes formed by the molding rolls 8, the perforate support 28 preferably is formed as a woven wire screen continuous conveyor belt, which is suitably supported in any conventional manner, as by longitudinally spaced rollers or bars or a supporting track along the outer longitudinal edge of the belt. This continuous belt is adapted to be driven in any suitable manner, as by a conventional chain and spocket, which may utilize a chain secured to both sides of the belt 28 in engagement with suitable spocket wheels 34 mounted on shafts supported on foundation blocks 35 and 36 at both ends of the equipment.

The briquettes supporting conveyor belt 28 is adapted to travel longitudinally through a heat treating chamber of a sintering furnace 37 and preferably is provided with upwardly extending sides 38 for retaining the briquettes on the upper surface of the belt. As shown in FIG. 16, the supporting conveyor belt 28 is driven so that it travels from the distributor at the briquette forming end 37' of the furnace 37 to the finished briquette delivery end 37" of the furnace, and the speed at which the belt travels can be controlled so as to control the time during which the briquettes are exposed to the heat treatment in the furnace.

The required time of exposure of briquettes to the heat treatment will vary to some extent according to the composition of the raw material from which the briquettes are made. In addition to moisture in the clay or shale, such material often includes carbonaceous compositions which may be burned or evaporated during the heat treating process. Where such carbonaceous material is burned, it adds to the heat in the furnace and, together with the evaporating of water and other liquids from the briquettes, produces a large number of relatively small voids in the body of the finished sintered briquettes. This foreign material burning and evaporating step in the treatment of the briquettes further assures an even distribution of heat throughout the material of each briquette, and thus assures a greater uniformity of the finished product.

In accordance with the present invention, raw briquettes are delivered from the molding rolls 8 by the distributor plates 26 to perforate supporting conveyor belt 28, and the molding rolls are driven at a speed which is regulated with reference to the speed of the conveyor belt, such that the briquettes will form a jackstrawed bed of a predetermined depth on the supporting conveyor belt to provide for the desired heat treatment of the briquettes during their travel through the sintering furnace 37. This jackstrawed bed of raw briquettes 11 upon the supporting conveyor belt 28 is clearly illustrated in FIG. 24, showing the raw briquettes immediately after delivery by the distributor plate 26 to the belt 28. As can be seen, the jackstraw asymmetrical arrangement of the briquettes results in a minimum of surface contact between adjacent briquettes. This assures a maximum exposure of the surface of each briquette, and thus assures the exposure of a maximum heat transfer surface for contact between the briquettes and the heating fluid. Briquettes which have been thus distributed in a jackstraw bed upon the perforate supporting conveyor belt move gradually in a steady flow into the sintering furnace 37.

In one embodiment of this invention, the sintering furnace extends substantially horizontally and includes a heating chamber which preferably is formed with heat insulating walls 39 and a similar heat insulating roof 40, both of which may comprise firebrick supported upon a suitable frame. This frame may include a base formed of supporting channel beams 41 which are mounted on posts 42. The inclosure between the walls 39, the roof 40, and the perforate supporting belt 28 forms the heating chamber 43 of the furnace into which the heat treating fluid is supplied for processing the briquettes 11. This heat treating fluid may comprise any suitable material, such as hot gas from previously burned fuel or a suitable burning mixture of fuel gas and oxygen. This fluid may conveniently be supplied into the chamber 43 through a plurality of transversely and longitudinally spaced nozzles 44 extending through the furnace walls 39 into the heating chamber 43 along the opposite sides thereof and connected to any suitable supply lines 45. In order to obtain the desired heat treatment and uniformity of result, the temperature of the heating chamber 43 should be regulated in a suitable manner, as by conventional thermostatic control responsive to the temperature in the chamber 43 or responsive to any other desired temperature in the system. Such a control can conveniently be provided by controlling the supply of gas or similar fluid through a regulating valve 46 connected between each nozzle 44 and its supply line 45. If desired, a more simple arrangement can be provided wherein a thermostatic control is not utilized and the supply of heating fluid may be simply regulated by a manual valve 46.

In order to obtain a thoroughly uniform heat treatment of the briquettes 11, the furnace 37 preferably is provided with a forced draft system. This system may comprise an exhaust chamber 47 formed in any suitable manner, as by sheet metal plates 48 mounted on the channel beams 41, which support the furnace walls 39 and are connected to suitable exhaust ducts 49. The heat treatment of the briquettes 11 also can be further regulated by controlling the exhaust pressure in the chamber 47. This can conveniently be regulated by providing exhaust fans or blowers mounted in suitable housings 50 connected to exhaust flues 51. These exhaust fans may be driven in any suitable manner, as by an electric motor 52 the speed of which may be regulated in accordance with any desired quantity, such as the temperature of the fluid exhausted from the furnace, for obtaining the desired heat treatment of the briquettes.

FIG. 24 schematically illustrates a heat treating furnace incorporating the foregoing features and clearly shows by arrows 53 the advantageous manner in which the hot gases flow through the interstices between the jackstrawed briquettes 11 and through the perforations in the wire supporting belt 28. A further significant advantage of this type of equipment is that a steady progressive movement of the supporting conveyor belt 28 maintains the bed of briquettes 11 in the desired jackstraw arrangement throughout the entire heat treating phase of the process. A jackstrawed bed of raw briquettes 11, as delivered by a distributor 26 to a conveyor belt 28, is shown in FIG. 24. The movement of the briquettes through the furnace does not redistribute or rearrange the bed of briquettes and thus does not in any way adversely affect the jackstrawing initially provided by the improved molding roll and distributor in supplying the briquettes to the perforate supporting belt.

Briquettes which have been completely heat treated may be simply discharged from the delivery end of the belt and stored in any suitable manner, as in a pit 54, or may be delivered directly to a grader or to a comminuter or crusher of any conventional type for breaking the sintered briquettes to a substantially uniform size of aggregate.

In order to obtain the most efficient operation of equipment for carrying out the process of forming and treating briquettes according to this invention, certain physical characteristics of briquettes have been found to be especially advantageous. Briquettes of the form illustrated in FIGS. 1–3, and 24 are essentially long slim elliptical sectioned cigar shaped elements, which are easy to manufacture by relatively simple molds requiring a minimum of maintenance and providing highly uniform finished aggregates. It has been found that this type of briquette preferably has a major diameter $a$ of its elliptical section between ½ and ⅝ inch and a minor diameter $b$ between ¼ and ⅜ inch, with a length $c$ between 3 and 6 inches.

This provided an elongated briquette wherein the ratio of major diameter to length is from 5:24 to 1:12, the ratio of minor diameter to length is from 1:8 to 1:24, while the ratio of minor diameter to major diameter is from 3:4 to 2:5. These dimensional characteristics of this type of briquette have been found to provide the needed cross sectional strength to minimize breakage of briquettes as they are delivered from the molding rolls to the perforate supporting conveyor belt and to be sufficiently thin in the direction of the minor diameter for efficient heat treatment and sintering of the raw material of which the briquettes are formed, as well as to provide for an effective release of vaporizable and gaseous substances from within the briquettes during the heat treating phase of the process. The length limitation of the briquettes assures that they will be sufficiently long in relation to their cross sectional area to provide the desired jackstraw patterned bed and not too long to cause breakage of the briquettes as they are delivered to the conveyor belt from the molding rolls.

According to another embodiment of this invention, shown in FIGS. 5–8, briquettes 55 may be molded to the same general characteristics as those previously described and additionally provided with transversely extending necked-down sections 56. Preferably, the necked-down sections are evenly spaced longitudinally of the briquettes so as to provide a plurality of ellipsoidal sections 57, which are joined in tandem by the necked-down sections 56. Such a briquette has a substantially lima bean pod configuration and has the advantage of providing additional air passages between adjacent ellipsoidal sections 57, which assist in assuring a uniformly heat treated final product. Furthermore, sintered briquettes having this lima bean pod configuration are more readily broken into an aggregate having a very uniform size.

Molding rolls for compressing raw material into briquettes of the lima bean pod configuration may be formed similar to the rolls 8 with an appropriate modification of the molding cavities 10 to provide the desired briquette configuration or may be constructed as shown in FIGS. 25–28. As illustrated in the latter figures, a molding roll may be formed of a pair of semi-cylindrical sections 58 and 59, on the outer surface of each which a plurality of longitudinally extending circumferentially spaced molding cavities are formed. These cavities are formed with a plurality of longitudinally spaced semi-ellipsoidal cavities 60 spaced from each other by a relatively shallow groove 61, which forms the connecting neck sections 56 of the molded briquettes. Circumferentially spaced molding cavities are spaced from each other by relatively narrow smooth longitudinal lands 62 which co-act with similar lands on a cooperating molding roll to form individually separate briquettes in the manner of the lands 11 on the molding rolls 8, as previously described.

This type of molding roll is particularly practical in that a plurality of such rolls can be assembled in tandem on a drive shaft, similar to shaft 13, FIG. 17; and, if repair is required or if it is desired to use less than a full number of molding rolls in the space provided between the shaft supporting bearings 15, the undesired roll or rolls may be readily dismantled by simply dismounting such roll or rolls from the drive shaft and substituting a spacer collar or blank roll. This dismounting is facilitated by providing each roll with a mounting hub 63 at each end thereof, which also is semi-cylindrical in shape and is formed with transversely extending apertures 64 and 65 which are respectively countersunk and threaded for the reception of assembly bolts 66, which securely fasten together the two semi-cylindrical halves of each molding roll. As in the previously described construction shown in FIGS. 16–21, each pair of molding rolls preferably is provided with a distributor for spreading the briquettes in a jackstraw pattern upon a perforate support, such as the conveyor belt 28 of FIGS. 16, 20, and 21.

In some instances, it may be found desirable to form a plurality of tandem ellipsoidally sectioned briquettes in which the ellipsoidal sections are necked-down to a greater extent than that shown in FIGS. 4–8. Such a configuration is shown in FIGS. 9 and 10, wherein ellipsoidal sections 67 of substantially uniform size are connected together by necked-down sections 68, which are reduced in size around the entire transverse periphery of a briquette. This type of briquette will provide a very uniform sized finished aggregate, similar to briquettes of the type shown in FIGS. 4–8, and will be found to be more readily breakable into individual ellipsoidal members of the size of each section 67, due to the greater necking-down of the interconnecting sections 68.

For certain uses, it is desirable that the aggregate should have a more intimate contact in the concrete than can be provided by substantially uniform aggregate elements. Furthermore, it may be found that when the aggregate comprises only substantially uniform sized elements, an excessive amount of fill, including both sand and cement, may be needed to provide the desired density to the concrete and the desired strength and adhesive properties. It becomes desirable, therefore, to provide aggregate having both large and small elements. The small elements in such aggregate will tend to fill in the spaces between the large elements and provide a more compact concrete with a smaller amount of fill in the nature of sand and cement. Such aggregate can also readily be made in accordance with this invention by molding briquettes having a plurality of tandem ellipsoidal sections of different size. FIGS. 11 and 12 illustrate this type of briquette. The briquette illustrated in these figures comprises alternately tandem arranged large and small ellipsoidal briquette sections 69 and 69', respectively. These briquettes may be formed in molding rolls of either the type shown in FIG. 17 or the type shown in FIGS. 25–28.

For certain uses it may be found desirable to provide aggregate elements which are not uniform in configuration. Such aggregate elements may readily be formed in accordance with this invention by molding briquettes 70 having a longitudinally wavy configuration, such as that shown in FIGS. 13–15. The cross section of such a briquette preferably is substantially elliptical, as shown in FIG. 15, and preferably has the same dimensional major and minor diameter relationships as the briquette shown in FIGS. 1–3. The relationship of the cross sectional diameters of the elliptical sections of such a briquette to the length of the briquette should also be substantially the same as those of the briquette shown in FIGS. 1–3. With such an arrangement, the ratio of length to average diameter should be from 5:1 to 24:1. In most instances, for practical molding purposes, it will be found desirable to form the briquette wavy lengthwise thereof only in one plane. Processing of such briquettes by the heat treating phase of the process in accordance with this invention is the same as that for briquettes of the type shown in FIGS. 1–3.

FIGS. 29–39 illustrate another embodiment of equipment incorporating the present invention which is adapted to provide the desired heat treatment of ore utilizing a vertical or shaft type furnace. As in the previously described apparatus, ore such as argillaceous material, is supplied to a suitable hopper 72 from which it is fed to briquetting rolls 73 of any desired type, such as those previously described for forming briquettes of the type shown in FIGS. 1–15. Raw briquettes 74 are formed by the rolls 73 and pass along a suitable chute 75 into a conveyor for delivery into the heat treating chamber of a furnace. This conveyor can conveniently be of the bucket type having a plurality of buckets 76 which carry the raw briquettes 74 to a position above an upper open mouth 77 of a vertical or shaft-type furnace. The raw briquettes 74 are dumped out of the buckets 76 and preferably are emptied over a spreader or distributor 78 of a general conical configuration. This spreader 78 is arranged in the mouth 77 of the furnace so as to cause the long slim briquettes to fall in a very haphazard asymmetrical jackstraw pattern into the space enclosed by furnace walls 79. These furnace walls may be of any suitable construction and preferably include one or more layers of suitable fire brick 80, enclosed in an insulating shell 81 within an outer steel shell 82. The briquettes which are fed into the space within the furnace form a jackstraw bed 74', as is more clearly shown in FIG. 38, which is supported in any suitable manner on a perforate grate. This perforate support provides for the admission of fluid, such as air, which is utilized in the heat treatment of the briquettes and may conveniently comprise alternately arranged rotary and stationary grate bars 83 and 84, respectively. These grate bars are adapted to support the jackstraw briquettes in a bed which may be conveniently subjected to the desired heat treatment by hot gases supplied to the furnace by nozzles 85 spaced circumferentially around the base of the furnace walls 79. The fluid, such as hot gas, supplied to the nozzles 85 may be the product of combustion of previously burned fuel, which may be either fully or partially burned, or may comprise liquid or gaseous fuel supplied through the nozzle 85 under pressure. The heat treating fluid which is supplied to the furnace through the nozzles 85 passes radially into the jackstraw bed of briquettes through the numerous additional I-beams 98 is arranged on each of the main I-beams 92 and extends for a substantial distance along each side of the central portion of the main I-beam. These two pairs of I-beams 98 serve to support the sides of the segmental mounting ring 95 and to provide additional rigidity to the support of the furnace walls 79. This main frame of the furnace is supported on a suitable foundation 99, preferably of concrete or other suitable heat-resistant material, constructed to provide an open pit 100 under the grate-bars 83 and 84 into which sintered briquettes 74' may be continuously led from the furnace.

In order to provide for the regulated continuous feed of completely heat-treated briquettes from the furnace, the rotatable grate-bars 83 are adapted to be driven synchronously through suitable gears 101 mounted on the grate bar trunnions 87 on one side of the grate-bars. These gears 101 may be driven at a regulated speed to assure a withdrawal of briquettes from the furnace at a rate determined by the sintered quality desired in the finished heat-treated briquettes. Rotation of the grate-bars 83 through the gears 101 can be obtained by driving them from any suitable source of power by a drive gear 102 mounted on a suitable jack shaft 103. As shown in FIG. 34, the jack shaft 103 may be conveniently supported by bearing blocks 104 mounted on one of the main I-beams 92 and may be driven in any conventional manner.

This construction not only provides for a convenient method for regulating the extent of the heat treatment of briquettes as they pass through the vertical shaft furnace, but also has the further advantage that briquettes passing between the rotatable grate-bars 83 and the stationary grate-bars 84 tend to become comminuted or broken and, therefore, require a lesser amount of spaces between the briquettes, as indicated by arrows 86, and come into very intimate contact with many exposed surfaces of the briquettes. This provides for a maximum uniform heat exchange between the fluid and the briquettes and results in a very uniform heat treated sintered finished product.

In order to provide for a substantially continuous process, the alternate grate bars 83 are formed with trunnions 87 at each end thereof, which are journaled in bearing blocks 88 secured in any suitable manner, as by bolts 89, to a cross beam formed by a channel bar 90 and an I-beam 91 secured, as by welding, to a main cross frame I-beam 92. Alternate intermediate grate bars 84 are stationarily mounted on blocks 93 which are suitably secured to flanges of short I-beam sections 94. These short I-beam sections provide a mounting frame structure for a water cooled base on which the furnace wall 79 is mounted. This water cooled base may conveniently be formed of a plurality of wedge shaped sections 95 which are hollow and through which water is adapted to be circulated so as to minimize the transfer of heat to a supporting under frame of the furnace.

This furnace under frame preferably is formed of conventional structural steel members, and includes the main I-beams 92, which are spaced apart and secured together by similar transversely extending cross I-beams 96. Reinforcing gussets 97, in the form of triangular sections of I-beams of substantially the same size as the beams 92 and 96, are secured, as by welding, to each corner of the I-beams 92 and 96 to form a rigid frame therewith. The upper flanges of the I-beams 92 and 96 and of the gussets 97 also provide a mounting platform for the short I-beam sections 94 on which the segmental mounting ring 95 is supported. A pair of subsequent crushing or similar treatment prior to a suitable grading for use as aggregate. Briquettes which pass into the pit 100 preferably are collected on a suitable conveyor belt 105 driven in any suitable manner, as by a roll 106, and are then transferred to any suitable storage bin, pit, or similar convenient collection point.

In certain applications, it may be found desirable to utilize a slightly different embodiment of distribtuor or spreader for assuring a proper distribution of briquettes in a jackstraw patterned bed in a vertical or shaft type furnace, such as that shown in FIG. 29. FIG. 31 illustrates such a modification of the spreader or distributor shown in FIGS. 29 and 30. In this embodiment, the conical distributor 78 is provided with a plurality of flutes or guides 107, which will aid in redistributing briquettes which may be discharged in clusters from the buckets 76 of the conveyor.

In some instances, it may be found desirable to utilize other types of briquette spreaders or distributors to provide the proper jackstrawing of the briquettes within the furnace. This will depend to a certain extent upon the manner in which the briquettes are delivered to the furnace, and the latter may depend to a degree upon the type of conveyor which transports the molded raw briquettes from the molding rolls 73 to the open mouth 77 of the vertical furnace. Where a conveyor belt is utilized or where the briquettes may be fed directly from molding rolls to the furnace by way of a suitable chute, a spreader or distributor 108 of the type shown in FIG. 32, may be found more practical than conical spreaders, such as that shown in FIGS. 29, 30, and 31. This spreader 108 is very similar to the spreaders 26 utilized in the apparatus shown in FIGS. 16–23. With this type arrangement raw briquettes 74 generally are fed as single units from the rolls 73 or from a conveyor belt. This forms a single column of briquettes 74, which can be distributed more easily into a thoroughly asymmetrical jackstraw pattern within the furnace by passage over the outwardly curved and downwardly sloping surface of a smooth sheet metal plate forming the spreader 108 for the reason that briquettes 74 normally are not strictly of uniform density throughout and therefore will tend to pass over the spreader 108 in different directions, as indicated by the briquettes 74". This has been found to assure the spreading of the briquettes within the furnace in a desired jackstraw pattern, as shown in FIG. 38, and provides the desired large surface exposure of briquettes for obtaining a substantially uniform sintering throughout individual briquettes and throughout all of the briquettes treated in such a furnace.

While particular embodiments of this invention have been illustrated and described, modifications thereof will occur to those skilled in the art. It is to be understood, therefore, that all arrangements and constructions within

I claim:

1. The process of treating raw argillaceous material comprising the step of shaping the raw argillaceous material into briquettes in the form of a series of longitudinally successively varying sized ellipsoidal nodules with necks joining adjacent nodules by stress-relieving fillets, feeding the briquettes in a jackstraw pattern to a pervious support to form a bed with a plurality of passageways between the briquettes, passing hot gas through the passageways for firing the briquettes, and breaking apart a substantial proportion of the briquettes at the necks thereof.

2. Apparatus for forming briquettes comprising means for applying pressure to increments of raw material and for shaping the same into elongated briquettes having lengths greater than their widths, a pervious briquette support, means arranged between said briquette shaping means and said pervious support for distributing the briquettes in a jackstraw pattern on said pervious briquette support in a bed having a depth greater than the length of the briquettes, a heating chamber, means for supporting said pervious briquette support in said heating chamber, means for passing heated gas through said pervious support and briquettes thereon in said heating chamber, and means for discharging briquettes from said pervious support out of said heating chamber.

3. Briquetting equipment comprising briquette molding rolls arranged in a cooperating pair, each of said rolls having a plurality of circumferentially spaced half-briquette mold cavities, said mold cavities being relatively long and substantially semi-elliptical in transverse cross section with tapered ends, means for feeding raw material to said pair of rolls, means for operating said rolls to mold briquettes of the material fed thereto, means for supporting said briquettes, means comprising a deflector element arranged between said rolls and said briquette supporting means for feeding briquettes formed by said rolls and for distributing said briquettes into a jackstraw pattern bed on said briquette supporting means, a firing chamber having an intake adjacent to said briquette feeding and distributing deflector element and a discharge end away from said intake, means for movably supporting said briquette supporting means in said firing chamber for progressively causing briquettes to pass from said intake toward said discharge end of said firing chamber, heating means including a fuel and air supply for firing said briquettes in said chamber, and means for passing hot gas from the burning of fuel from said supply through the jackstraw bed of briquettes, said means for movably supporting said briquette supporting means progressively discharging fired briquettes from the jackstraw bed in said chamber through said discharge end thereof.

4. Briquette forming apparatus as claimed in claim 2 wherein said pressure applying means comprises briquette molding rolls arranged in a cooperating pair, each of said rolls having a plurality of sections each with a row of circumferentially spaced half-briquette mold cavities, means for feeding raw material to said pair of rolls, said heating chamber having an intake adjacent to said briquette distributing means and a discharge away from said intake, and said briquette support including means for progressively causing briquettes to pass through said heating chamber from said intake toward said discharge end of said heating chamber.

5. Briquette forming apparatus as claimed in claim 2 wherein said pressure applying means comprises briquette molding rolls arranged in cooperating pairs, each of said rolls having a plurality of axially spaced rows of circumferentially spaced half-briquette mold cavities, the mold cavities in axially adjacent circumferential rows being staggered with the longitudinal center midway between the longitudinal center lines of mold cavities in an adjacent circumferential row, means for feeding raw argillaceous material to said pair of rolls, and said discharging means including means for breaking the discharged briquettes into relatively smaller pieces.

6. The process of treating raw material of mixed argillaceous and carbonaceous compositions comprising the step of shaping the raw material into generally cigar-shaped briquettes of a series of ellipsoidal nodules with necks connecting adjacent nodules by stress-relieving fillets and substantially longer than they are wide, feeding the briquettes to a pervious support into a jackstraw pattern bed arrangement with a plurality of passageways between the briquettes, passing hot gas through the passageways for firing the briquettes, and discharging the fired briquettes and breaking the fired briquettes into smaller pieces.

References Cited in the file of this patent

UNITED STATES PATENTS

| | | |
|---|---|---|
| 703,562 | Edison | July 1, 1902 |
| 805,106 | Treadwell | Nov. 21, 1905 |
| 1,258,849 | Zwoyer et al. | Mar. 12, 1918 |
| 1,295,764 | Komarek | Feb. 25, 1919 |
| 1,839,699 | Parkhurst | Jan. 5, 1932 |
| 1,879,293 | Jones | Sept. 27, 1932 |
| 1,893,417 | Komarek et al. | Jan. 3, 1933 |
| 2,032,624 | Lyons | Mar. 3, 1936 |
| 2,161,162 | Harsch | June 6, 1939 |
| 2,180,757 | Hermann | Nov. 21, 1939 |
| 2,213,041 | Hermann | Aug. 27, 1940 |
| 2,230,309 | Reed | Feb. 4, 1941 |
| 2,252,427 | Hermann | Aug. 12, 1941 |
| 2,287,663 | Brassert | June 23, 1942 |
| 2,522,982 | Bassett | Sept. 19, 1950 |